(12) United States Patent
Karlsson (10) Patent No.: US 11,267,051 B2
(45) Date of Patent: Mar. 8, 2022

(54) BUILD TANK FOR AN ADDITIVE MANUFACTURING APPARATUS

(71) Applicant: Arcam AB, Moelndal (SE)

(72) Inventor: Kristofer Karlsson, Kungsbacka (SE)

(73) Assignee: Arcam AB, Moelndal (SE)

( * ) Notice: Subject to any disclaimer, the term of this patent is extended or adjusted under 35 U.S.C. 154(b) by 393 days.

(21) Appl. No.: 16/266,671

(22) Filed: Feb. 4, 2019

(65) Prior Publication Data

US 2019/0262900 A1 Aug. 29, 2019

Related U.S. Application Data

(60) Provisional application No. 62/635,941, filed on Feb. 27, 2018.

(51) Int. Cl.
| | | |
|---|---|---|
| *B22F 12/00* | (2021.01) | |
| *B22F 1/00* | (2022.01) | |
| B33Y 30/00 | (2015.01) | |
| B22F 3/10 | (2006.01) | |
| B33Y 40/00 | (2020.01) | |
| B33Y 10/00 | (2015.01) | |
| B22F 10/10 | (2021.01) | |

(52) U.S. Cl.
CPC ............ *B22F 12/00* (2021.01); *B22F 1/0003* (2013.01); *B22F 10/10* (2021.01); *B22F 2003/1042* (2013.01); *B33Y 10/00* (2014.12); *B33Y 30/00* (2014.12); *B33Y 40/00* (2014.12)

(58) Field of Classification Search
CPC ......... B22F 10/20; B22F 12/00; B29C 64/255
See application file for complete search history.

(56) References Cited

U.S. PATENT DOCUMENTS

| | | |
|---|---|---|
| 2,264,968 A | 12/1941 | De Forest |
| 2,323,715 A | 7/1943 | Kuehni |
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |

(Continued)

FOREIGN PATENT DOCUMENTS

| | | |
|---|---|---|
| CA | 2860188 A1 | 6/2006 |
| CH | 514096 A | 10/1971 |

(Continued)

OTHER PUBLICATIONS

International Search Report and Written Opinion for application PCT/EP2019/054616 dated May 15, 2019 (10 pages).

(Continued)

*Primary Examiner* — James Sanders
(74) *Attorney, Agent, or Firm* — Dinsmore & Shohl LLP (57) ABSTRACT

Described is a build chamber for an additive manufacturing apparatus for forming a three-dimensional article layer by layer from a powder. The build chamber comprises a build chamber base body and said build chamber base body is formed by at least two segments telescopically coupled together.

15 Claims, 7 Drawing Sheets

(56) References Cited

U.S. PATENT DOCUMENTS

| | | |
|---|---|---|
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,595,670 A | 1/1997 | Mombo Caristan |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,494,636 B1 | 12/2002 | Mozena |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,505,172 B2 | 11/2016 | Ljungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2005/0173380 A1 | 8/2005 | Carbone |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ackelid |
| 2012/0225210 A1 | 9/2012 | Fruth |
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1 | 3/2015 | Nordkvist et al. |
| 2015/0086409 A1 | 3/2015 | Hellestam |
| 2015/0088295 A1 | 3/2015 | Hellestam |
| 2015/0130118 A1 | 5/2015 | Cheng et al. |

(56) References Cited

U.S. PATENT DOCUMENTS

| | | |
|---|---|---|
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0202686 A1 | 7/2015 | Wimpenny |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154444 A1 | 6/2018 | Jonasson |

FOREIGN PATENT DOCUMENTS

| | | |
|---|---|---|
| CN | 101607311 A | 12/2009 |
| CN | 101635210 A | 1/2010 |
| CN | 201693176 U | 1/2011 |
| CN | 101607311 B | 9/2011 |
| CN | 103447528 A | 12/2013 |
| CN | 203509463 U | 4/2014 |
| CN | 107584627 A | 1/2018 |
| DE | 19952998 A1 | 5/2001 |
| DE | 20305843 U1 | 7/2003 |
| DE | 10235434 A1 | 2/2004 |
| DE | 102005014483 A1 | 10/2006 |
| DE | 202008005417 U1 | 8/2008 |
| DE | 102007018601 A1 | 10/2008 |
| DE | 102007029052 A1 | 1/2009 |
| DE | 102008012064 A1 | 9/2009 |
| DE | 102009020987 A1 | 11/2010 |
| DE | 102010041284 A1 | 3/2012 |
| DE | 102011105045 B3 | 6/2012 |
| DE | 102013210242 A1 | 12/2014 |
| EP | 0289116 A1 | 11/1988 |
| EP | 0322257 A2 | 6/1989 |
| EP | 0688262 A1 | 12/1995 |
| EP | 1358994 A1 | 11/2003 |
| EP | 1418013 A1 | 5/2004 |
| EP | 1466718 A2 | 10/2004 |
| EP | 1486318 A2 | 12/2004 |
| EP | 1669143 A1 | 6/2006 |
| EP | 1683593 A2 | 7/2006 |
| EP | 1721725 A1 | 11/2006 |
| EP | 1752240 A1 | 2/2007 |
| EP | 1952932 A2 | 8/2008 |
| EP | 2011631 A1 | 1/2009 |
| EP | 2119530 A1 | 11/2009 |
| EP | 2281677 A1 | 2/2011 |
| EP | 2289652 A1 | 3/2011 |
| EP | 2292357 A1 | 3/2011 |
| EP | 2832474 A1 | 2/2015 |
| FR | 2980380 A1 | 3/2013 |
| JP | H05-171423 A | 7/1993 |
| JP | 2003241394 A | 8/2003 |
| JP | 2003245981 | 9/2003 |
| JP | 2009006509 A | 1/2009 |
| SE | 524467 C2 | 8/2004 |
| WO | WO 1993/08928 A1 | 5/1993 |
| WO | WO 1996/012607 A1 | 5/1996 |
| WO | WO 1997/37523 A2 | 10/1997 |
| WO | WO 2001/081031 A1 | 11/2001 |
| WO | WO 2001/85386 A2 | 11/2001 |
| WO | WO 2002/008653 A1 | 1/2002 |
| WO | WO 2004/007124 A1 | 1/2004 |
| WO | WO 2004/043680 A2 | 5/2004 |
| WO | WO 2004/054743 A1 | 7/2004 |
| WO | WO 2004/056511 A1 | 7/2004 |
| WO | WO 2004/106041 A2 | 12/2004 |
| WO | WO 2004/108398 A1 | 12/2004 |
| WO | WO 2006/091097 A2 | 8/2006 |
| WO | WO 2006/121374 A1 | 11/2006 |
| WO | WO 2007/112808 A1 | 10/2007 |
| WO | WO 2007/147221 A1 | 12/2007 |
| WO | WO 2008/013483 A1 | 1/2008 |
| WO | WO 2008/057844 A1 | 5/2008 |
| WO | WO 2008/074287 A1 | 6/2008 |
| WO | WO 2008/125497 A1 | 10/2008 |
| WO | WO 2008/147306 A1 | 12/2008 |
| WO | WO 2009/000360 A1 | 12/2008 |
| WO | WO 2009/072935 A1 | 6/2009 |
| WO | WO 2009/084991 A1 | 7/2009 |
| WO | WO 2010/095987 A1 | 8/2010 |
| WO | WO 2010/125371 A1 | 11/2010 |
| WO | WO 2011/008143 A1 | 1/2011 |
| WO | WO 2011/011818 A1 | 2/2011 |
| WO | WO 2011/030017 A1 | 3/2011 |
| WO | WO 2011/060312 A2 | 5/2011 |
| WO | WO 2012/102655 A1 | 8/2012 |
| WO | WO 2013/092997 A1 | 6/2013 |
| WO | WO 2013/098050 A1 | 7/2013 |
| WO | WO 2013/098135 A1 | 7/2013 |
| WO | WO 2013/159811 A1 | 10/2013 |
| WO | WO 2013/167194 A1 | 11/2013 |
| WO | WO 2013/178825 A2 | 12/2013 |
| WO | WO 2014/071968 A1 | 5/2014 |
| WO | WO 2014/092651 A1 | 6/2014 |
| WO | WO 2014/095200 A1 | 6/2014 |
| WO | WO 2014/095208 A1 | 6/2014 |
| WO | WO 2014/195068 A1 | 12/2014 |
| WO | WO 2015/032590 A2 | 3/2015 |
| WO | WO 2015/091813 A1 | 6/2015 |
| WO | WO 2015/120168 A1 | 8/2015 |
| WO | WO 2015/142492 A1 | 9/2015 |

OTHER PUBLICATIONS

International Search Report and Written Opinion for application PCT/EP2019/054631 dated May 15, 2019 (10 pages).
Cheah, Chi-Mun, et al., "Automatic Algorithm for Generating Complex Polyhedral Scaffold Structure for Tissue Engineering", Tissue Engineering, 2004, pp. 595-610, vol. 10, No. 3/4, XP002691483.

(56) References Cited

OTHER PUBLICATIONS

Gibson, D.W., et al., "Additive Manufacturing Technologies: Rapid Prototyping to Direct Digital Manufacturing", 2010, pp. 126-129, Springer, New York.
Guibas, Leonidas J., et al., "Randomized Incremental Construction of Delaunay and Voronoi Diagrams", Algorithmica, Jun. 1992, pp. 381-413, vol. 7, Issue 1-6, Springer-Verlag, New York.
Klassen, Alexander, et al., "Modelling of Electron Beam Absorption in Complex Geometries", *Journal of Physics D: Applied Physics*, Jan. 15, 2014, 12 pages, vol. 47, No. 6, Institute of Physics Publishing Ltd., Great Britain.
Motojima, Seiji, et al., "Chemical Vapor Growth of LaB6 Whiskers and Crystals Having a Sharp Tip", Journal of Crystal Growth, vol. 44, No. 1, Aug. 1, 1978 (Aug. 1, 1978), pp. 106-109.
Weigel, TH., et al., "Design and Preparation of Polymeric Scaffolds for Tissue Engineering," Expert Rev. Med. Devices, 2006, pp. 835-851, vol. 3, No. 6, XP002691485.
Yang, et al., *"The Design of Scaffolds for Use in Tissue Engineering, Part II, Rapid Prototyping Techniques"*, Tissue Engineering, 2002, pp. 1-11, vol. 8, No. 1, XP002691484.
Chinese Patent Application No. 201980015627.5 Office Action, dated Dec. 29, 2021 (28 pages with English Translation).
Chinese Patent Application No. 201980015626.0 Office Action, dated Jan. 6, 2022 (19 pages with English Translation).

BUILD TANK FOR AN ADDITIVE MANUFACTURING APPARATUS

CROSS REFERENCE TO RELATED APPLICATIONS

This application claims priority to and the benefit of U.S. Provisional Patent Application No. 62/635,941, filed on Feb. 27, 2018, the contents of which as are hereby incorporated by reference in their entirety.

BACKGROUND

Related Field

The invention relates to a build tank for an additive manufacturing apparatus for forming a three-dimensional article layer by layer from a powder material.

Description of Related Art

Freeform fabrication or additive manufacturing (AM) using electron beam melting (EBM) or laser beam melting is a method for forming a solid three-dimensional article from a powder. The three-dimensional article is formed layer by layer by successive fusion of selected areas of powder layers, which selected areas correspond to successive layers of the three-dimensional article. A layer of powder, such as metal powder, is deposited on a build area and an electron beam or a laser beam is used to selectively melt the powder layer of the build area. The melted material fuses with underlaying layers and solidifies to form the top layer of the solid three-dimensional article. A further layer of powder is deposited onto the previous layer, and the electron or laser beam is used to selectively melt the further powder layer of the build area. The melted material solidifies and form another solid layer fused onto the previous solid layer. This process is repeated for multiple layers until the desired 3D geometry of the article is achieved.

An apparatus for forming such a three-dimensional article has a build table onto which the three-dimensional article is to be formed, a powder distributor device for delivering powder to the build table (build area) for the formation of the powder layers and an electron beam source or a laser beam source for providing the energy beam used for melting the powder. The build table is arranged in a build tank which in turn is arranged in a build chamber formed by a casing. When using EBM, the build chamber is a vacuum chamber.

The build table is usually displaceable relative to the build tank in the vertical direction for maintaining the level of the top surface of the build layer (powder bed) when adding powder layers. During the build process the powder applied should be prevented from moving from the build area of the build table to a position under the build table. For avoiding such powder leakage between the build tank and the build table, a seal can be arranged on the periphery of the build table. For high temperature powder, such seals made from a ceramic material in form of a rope will however often require a plurality of rounds of the rope around the build table for achieving the sealing function. In laser based additive machines the seals maybe made of felt. Further, under unfavourable conditions particles from the ceramic rope or the felt can pollute the metal powder used for the build process. Such solution with a build tank and a sealed build table is relatively expensive to produce and is nevertheless sensitive to powder leak.

BRIEF SUMMARY

Having this background, an object of the invention is to provide a build tank for an additive manufacturing apparatus for forming a three-dimensional article layer by layer from a powder, which is more or less insensitive to powder leak and is cheaper to produce compared to prior art solutions.

The objective is achieved by a build chamber for an additive manufacturing apparatus for forming a three-dimensional article layer by layer from powder, the build chamber comprising a build chamber base body and a build table, wherein the build chamber base body is formed by at least two segments telescopic coupled together.

A non-limiting advantage is that the machine is easier to load, less bulky and easier to levelling a start plate onto which the three-dimensional article is to be built. Another advantage is that there is a higher permissible dimension variations in the present inventive build tank compared to the prior art solution. Still another advantage is that the inventive build tank is more or less insensitive to temperature variations.

In another example embodiment of the present invention a top segment fits inside a bottom segment. Powder leakage between segments of the build chamber base body may be eliminated by starting with the smallest dimension at the top and attach all other segments outside each other. As the build table is moving in a downward direction, powder has to be transferred upwards in order to leak which is not likely if there is a sufficient overlap between adjacent segments when the telescopic build tank is in a fully extracted position.

In another example embodiment of the present invention the top segment may be releasably attached to a powder table surrounding the build chamber base body. An exemplary advantage of at least this embodiment is that the top segment of the build chamber and the powder table may be fixed to each other while the building of the three-dimensional article takes place. This may also allow for a safe extraction and contraction of the telescopic build chamber without risking any powder spill between the build chamber and the powder table.

In another example embodiment of the present invention the bottom segment may be releasably attached to the build table. An exemplary advantage of at least this embodiment is that the build table may be moved up and down for extraction and contraction of the telescopic build chamber without risking to lose contact between the build tank and the build table. Once the three-dimensional article has been finished, the build chamber may be detached from the powder table together with the three-dimensional article and removed from the additive manufacturing apparatus. The build table is fixed relative to the bottom segment and there is no friction between the build table and the inside of the build tank as in the prior art solution.

In another example embodiment of the present invention at least one stroke limitation wire may be attached between each two adjacent segments of the build chamber for creating at least a minimum overlap between the segments when the at least one stroke limitation wire is at its full length. An exemplary advantage of at least this embodiment is that the telescopic build chamber may not fall apart during an extraction of the build chamber.

In another example embodiment of the present invention the at least one stroke limitation wire is attached on the outside of the segments. An exemplary advantage of at least this embodiment is that the wires if attached to the outside may not interfere with the powder material.

In still another example embodiment of the present invention a segment x has a lower flange which extends radially outwards and that an adjacent segment x+1 is having an upper flange which extends radially inwards, where the lower flange and the upper flange in the adjacent segments x and x+1 respectively limits the stroke of the telescopic build tank in a downward direction where segment x+1 is a larger segment compared to segment x. An exemplary advantage of at least this embodiment is that the stroke limitation is built in the segments from the beginning.

In yet another example embodiment of the present invention the build chamber base body may have a circular, elliptical or a polygonal shape. An exemplary advantage of at least this invention is that the telescopic build tank may have any shape without risking powder leakage.

In still another example embodiment of the present invention the releasably attachment of the build tank to the powder table and/or the build table is in the form of a bayonet joint or an eccentric latch. An exemplary advantage of the present invention is that different types of releasably attachment may be used.

In still another example embodiment of the present invention the minimum overlap is at least 5 mm in a fully extracted position. Powder leakage may be eliminated if the gap between an outer dimension of segment x and an inner dimension of segment x+1 is smaller than the overlap.

Further advantages and advantageous features of the invention are disclosed in the following description and in the claims provided herein.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

FIG. 1 is a schematic view of an AM apparatus having a build tank according to the present invention.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 1:
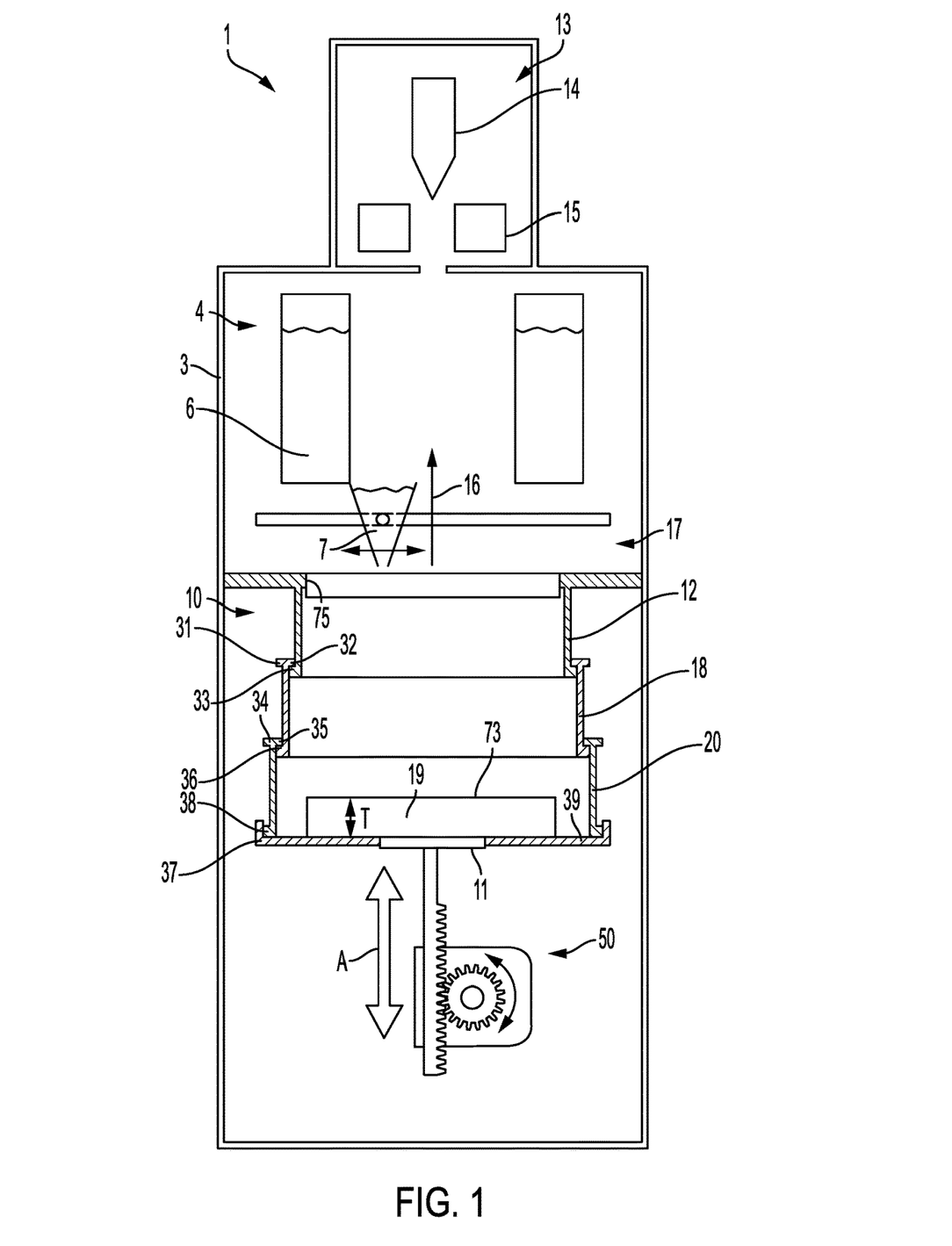
FIG. 1 is a schematic view of a build layer and an indicated scanning pattern for an area of solid material.

FIG. 1 shows an AM apparatus 1 with an inventive build tank 10 for forming a three-dimensional article layer by layer by successive fusion of selected areas of a powder layers, which selected areas correspond to successive layers of the three-dimensional article. The apparatus 1 comprises an outer casing 3 forming a build chamber 4, and the build tank 10 arranged inside the casing 3 in the build chamber 4.

Further, the apparatus 1 comprises a powder hopper 6, a powder distributor device 7, a powder table 17 and a build table 19 for receiving powder from the powder distributor device 7. The build table 19 is arranged inside the build tank 10. The build table 19 has a top surface 73 for receiving powder from the powder distributor device 7. The top surface 73 of the build table 19 is preferably flat and horizontal and is faced upwardly in a vertical direction. In FIG. 1 the build table 19 is having a predetermined thickness T. In an alternative embodiment the thickness T may be decreased to zero meaning that the top surface 73 of the build table 19 is entirely on the same level as a support surface 39.

A platform device 11 comprises means 50 for movement of the build table 19 and support surface 39 in a vertical direction up or down indicated by arrow A in FIG. 1. Such means may for instance be a servo motor equipped with a gear, adjusting screws, etc. The powder distributor device 7 is arranged to lay down a thin layer of the powder material on a build plate or powder bed in the build tank 10, i.e., one may start to build on a powder bed arranged on the build table 19 or directly on a removable build plate (not shown) which may be in direct contact with its underside with the build table 19 or there may be a powder layer in between the build table 19 and the build plate. During a work cycle the build table 19 will be lowered for maintaining the position of the top surface of the powder bed relative to the build tank 10 when adding powder layers to the powder bed.

The apparatus 1 has an energy beam source 13 arranged for creating an energy beam. The energy beam is used for melting the selected areas of the powder. The energy beam is scanned over the surface of the current powder layer for melting the selected areas. The selected areas of each layer can be based on a model dividing the article to be manufactured in successive layers or slices. The model may be a computer model generated by a CAD (Computer Aided Design) tool.

In the example embodiment illustrated in FIG. 1, the energy beam source is an electron beam source 13. The electron beam source can be designed in a way well known to the person skilled in the art. The electron beam source may have an electron gun 14 with an emitter electrode which is connected to a high voltage circuit and a current source for accelerating electrons and releasing electrons from the emitter electrode. These electrons form the electron beam. The electron beam source has also focusing coils and deflection coils 15 for directing the electron beam to various positions of the build layer surface.

The build chamber 4 can be arranged for maintaining a vacuum environment by means of a vacuum system, which may comprise a turbomolecular pump, a scroll pump, an ion pump and one or more valves. Such a vacuum system is known to the person skilled in the art and is not further described or illustrated herein.

In another embodiment of the apparatus, any other suitable energy beam source can be used. For example, a laser beam source. The laser beam source can be designed in a way well known to the person skilled in the art. The laser beam source may have a laser emitter for emitting photons. These photons form the laser beam. The laser beam source has also focusing units and deflection units for directing the laser beam to various positions of the build layer surface. The focusing units can comprise lenses and the deflection units can comprise mirrors.

The build tank 10 comprises a top segment 12, an intermediate segment 18, a bottom segment 20, the build table 19 and the support surface 39. The top segment 12 fits inside the intermediate segment 18 which in turn fits inside the bottom segment 20 and thereby forming a telescopic build tank 10.

The top segment 12 has a lower flange 33 which extends radially outwards and the intermediate segment is having an upper flange 32 which extends radially inwards. The lower flange 33 extending radially outwards in the top segment 12 and the upper flange 32 extending radially inwards in the intermediate segment 18 limit the stroke of the telescopic build tank in a downward direction since an outer dimension of the lower flange 33 is larger than an inner dimension of the upper flange 32.

In a similar manner the intermediate segment 18 has a lower flange 36 which extends radially outwards and the bottom segment 20 is having an upper flange 35 which extends radially inwards. The lower flange 36 extending radially outwards in the intermediate segment 18 and the upper flange 35 extending radially inwards in the bottom segment 20 limit the stroke of the telescopic build tank in a downward direction since an outer dimension of the lower flange 36 is larger than an inner dimension of the upper flange 35.

In FIG. 1 only 3 segments are shown, however instead of just using one intermediate segment more than one intermediate segment is also possible if one wants a larger stroke of the build tank, i.e., one needs to build objects with a larger height.

Optional flange 31 in the intermediate segment 18 extending radially outwards may limit the contraction of the telescopic build tank in an upward direction. The build tank as depicted in FIG. 1 may be manufactured by additive manufacturing. Alternatively the flange 31 may have a number of recesses building a pattern adapted to fit into the flange 34. Assembly may be performed by aligning the intermediate segment and the bottom segment with each other so that the flanges may pass each other. By rotating the intermediate segment and the bottom segment a predetermined angle relative to each other, the two segments may not pass each other.

The support surface 39 may be protruding from the bottom section of the build table 19. The support surface 39 has the functionality of pushing the segments 12, 18, 20 in an upward direction. An optional wall section 37 is extending in an upward direction from the support surface 39. The wall section 37 and the support surface 39 is forming a recess prohibiting powder from falling out from the build tank 10. In an alternative embodiment the top surface 73 of the build table 19 is at the same level as the support surface 39. The bottom part of the bottom segment 20 seals to the support surface 39 or the optional wall section 37. The bottom segment is releasably attached to the support surface 39 and/or the optional wall section 37. The intermediate section and the top section is not attached to the support surface and/or the optional wall section 37.

The build table 19 and support surface 39 may be fixed to the bottom segment 20, 220. This means that there are no friction between the inside of the build tank 10 and the build table 19 or the support surface 39. Since there is always a gap between adjacent segments in the telescopic build tank 10, which gap may be chosen to be several mm, there is more or less no mechanical contacts between individual moving elements in the inventive build tank but is will nevertheless prohibit powder from falling out from the build tank. The telescopic build tank 10 with the overlap between adjacent segments and that the bottom segments is fixed to the support surface will prohibit powder to escape from the telescopic build tank 10.

The bottom segment 20 may be releasably attached to the build table. The releasably attachment may be in the form of a bayonet joint or an eccentric latch. The bottom segment 20 may or may not be equipped with a flange 38. The bayonet joint may be provided in the wall section 37 and in a part of the bottom segment 20 facing towards the wall section 37.

Figure 2:
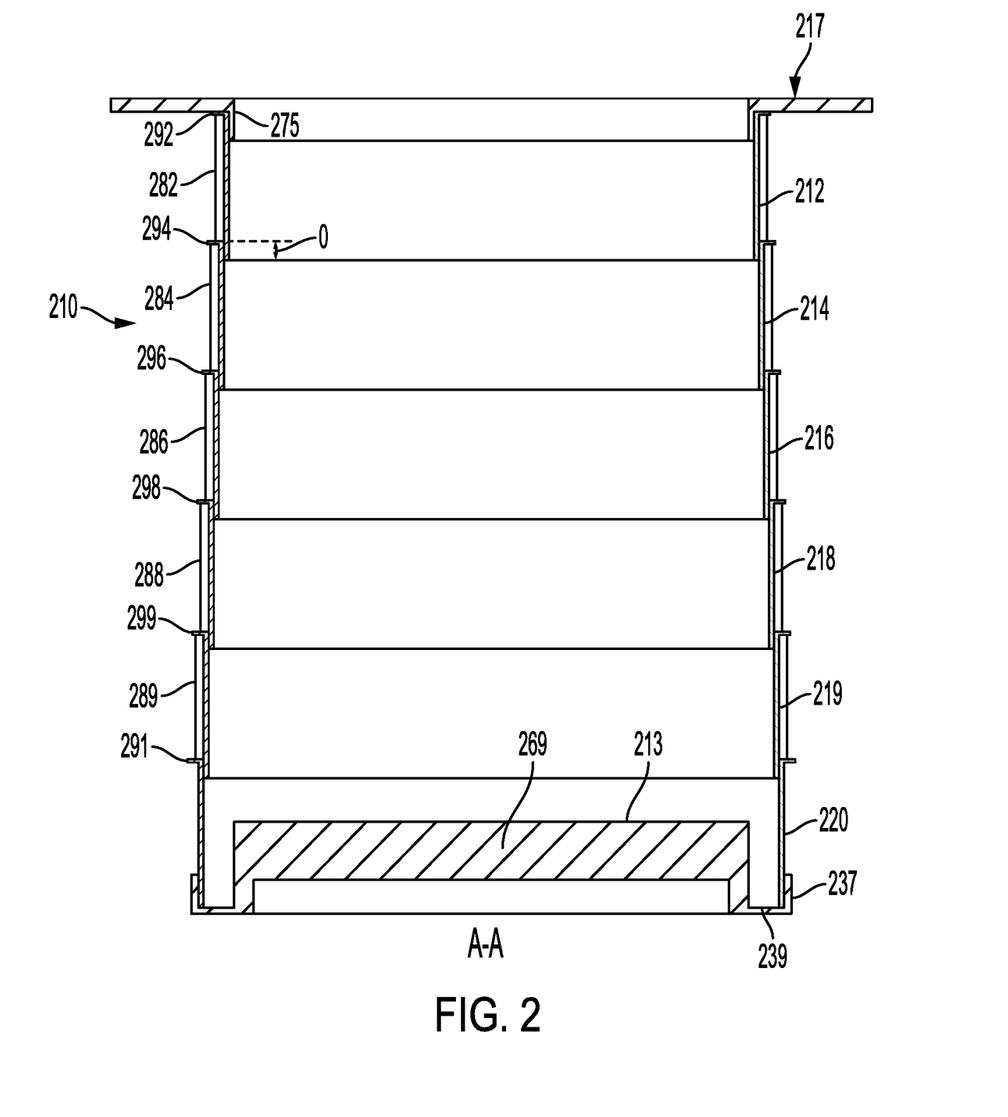
FIG. 2 is a schematic cut view of another embodiment of a telescopic build tank according to the present invention.

In a similar manner the top segment 12 may be releasably attached to the powder table 17 by means of a bayonet joint or an eccentric latch. FIGS. 1 and 2 depicts a first example embodiment of attaching the top segment 12 to the powder table 17. The powder table 17 may comprise a collar 75 extending in a downward direction from the powder table and with an inner dimension adapted to fit inside the top segment 12. On the outside of the collar 75, 275 the bayonet joint may be arranged. On an inside of the top segment facing towards the collar 75 a corresponding part of the bayonet joining may be arranged. Alternatively, a first part of an eccentric latch is attached to the underside of the powder table 17 and a second part of the eccentric latch is attached to the outside of the top segment 12.

The platform device 11 may be releasably attached to the build table 19 allowing for the build table to move up and down without risking to lose contact with each other. The releasable attachment maybe in the form of a bayonet joint or eccentric latch.

The telescopic build tank 10 may be made of the same material as the material for forming the three-dimensional article inside the telescopic build tank 10. The telescopic build tank may have a circular cross section, an elliptical cross section a triangular cross section a rectangular cross section or any particular shape which is suitable for allowing segments of similar shape but slightly different dimension to slide into each other.

The gap (minimum distance between surfaces moving relative to each other) between adjacent segments may be in the range of 1-5 mm. The minimum overlap between adjacent segments may be in the range of a few mm to 20 mm in maximum protracted position. In an example embodiment the overlap in relation to the gap may be 1:1 for gaps in the range of 0.1-25 mm.

FIG. 2 depicts another example embodiment of the inventive telescopic build tank 210. This telescopic build tank 210 comprises a top segment 212 and a bottom segment 220. In between the top and bottom segments are arranged a first intermediate segment 214, a second intermediate segment 216, a third intermediate segment 218 and a forth intermediate segment 219. Each segment 212, 214, 216, 218, 219, 220 is provided with an upper flange 292, 294, 296, 298, 299, 291 respectively, which extends radially outwards. The top segment 212 is having the smallest outer dimension and the bottom segment 220 is having the largest outer dimension. At least one string or wire 282 is attached between the upper flange 292 of the top segment 212 and the upper flange 294 of the first intermediate segment 214. This string or wire is having a length adapted for prohibiting the top segment 212 and the first intermediate segment 214 to detach from each other. The length of the string or wire is adapted as a protraction limitation of adjacent segments in the telescopic build tank 210. When the string or wire 282 is extended to its full length the top segment 212 is overlapping the first intermediate segment 214 with a predetermined distance denoted with O in FIG. 2. In a similar manner at least one string or wire 284 is attached between the upper flange 294 of the first intermediate segment 214 and the upper flange 296 of the second intermediate segment 216. At least one string or wire 286 is attached between the upper flange 296 of the second intermediate segment 216 and the upper flange 296 of the third intermediate segment 218. At least one string or wire 288 is attached between the upper flange 298 of the third intermediate segment 218 and the upper flange 299 of the fourth intermediate segment 219. At least one string or wire 289 is attached between the upper flange 299 of the fourth intermediate segment 219 and the upper flange 291 of the bottom segment 220.

As in the previous example embodiment, the top segment 212 may be releasably attached to the powder table 217. In FIG. 2 the upper flange 292 is arranged at the underside of the powder table 217. A bayonet joint may be provided at the upper flange 292 and a surface of the powder table facing towards the upper flange 292. Alternatively the bayonet flange may be provided at a collar section 275 extending in a downward direction from the powder table 217. A corresponding part of the bayonet joint may be provided on the top segment facing towards the collar section 275.

The overlap denoted by O in FIG. 2 may be in the range of a few mm to 10 mm. A gap between adjacent segments, for instance a top segment 212 and a first intermediate segment 214, may be in the range of a few mm to 10 mm. The gap between adjacent segments may be equal for all adjacent segments or different for different adjacent segments in a single telescopic build tank 210. The sum of all thicknesses of the segments 212, 214, 216, 218, 219 and 220 plus the gap in between the segments is smaller than the recess 239 in the build table 269. The build table 269 may be releasably attached to the bottom segment 220. This may be in the form of a bayonet joint provided at an inside portion of a wall section 237 extending in an upward direction. A corresponding part of the bayonet joint is provided in the bottom segment 220 facing towards the wall section 237.

Figure 3:
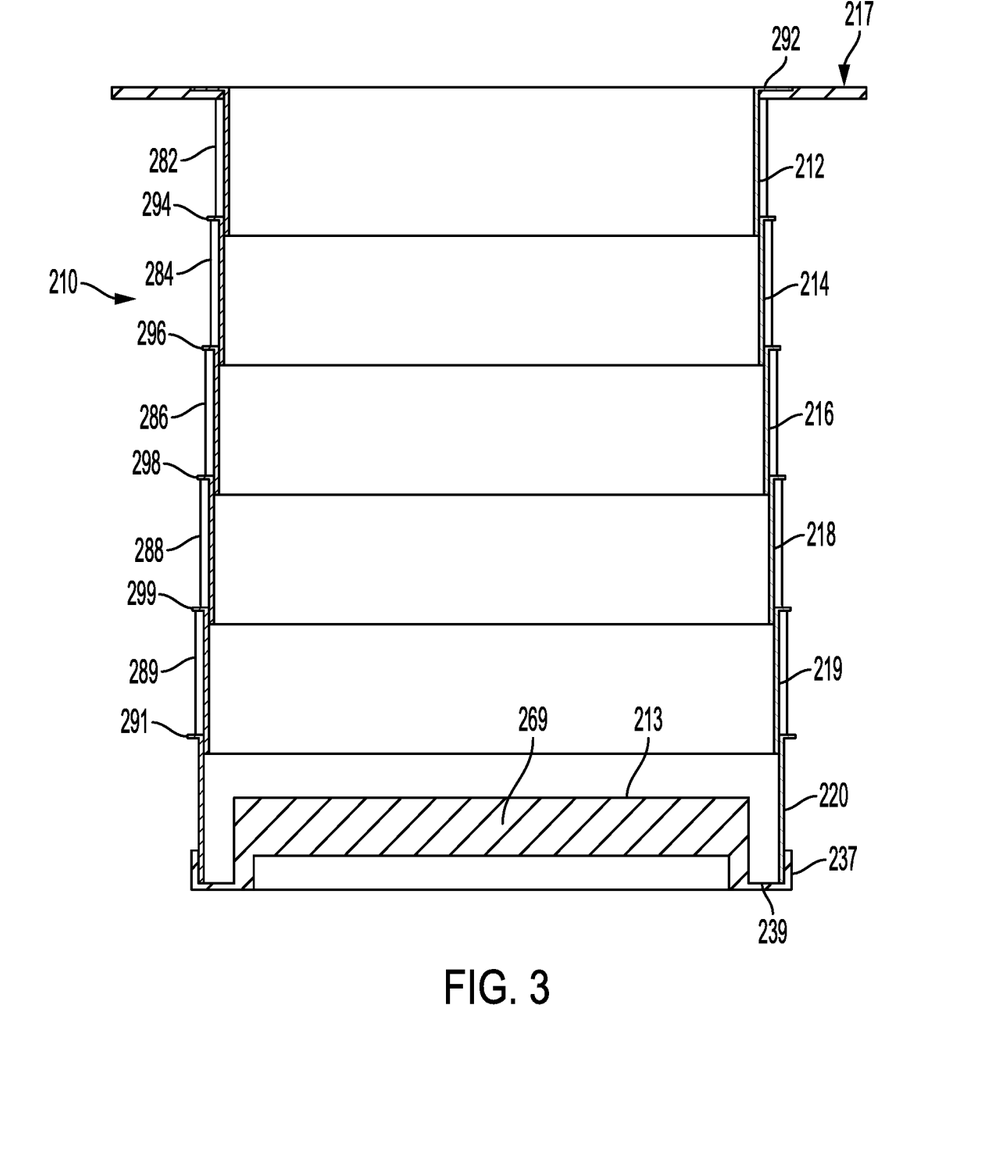
FIG. 3 is a schematic cut view of yet another embodiment of a telescopic build tank according to the present invention.

FIG. 3 depicts still another example embodiment of the telescopic build tank 210. The only difference compared to the embodiment as shown in FIG. 2 is how the top segment 212 is attached to the powder table 217 and the attachment of the at least one string or wire 282 for limiting the stroke of the first intermediate segment 214. In FIG. 3 the upper flange 292 of the top segment 212 is arranged on the upper side of the powder table 217. The flange is so to say hanging on the powder table 217. The powder table may have a recess with about the same dimension as the flange 292 resulting in a top surface of the powder table 217 and the flange 292 at the same height. The at least one string or wire 282 for restricting the elongation of the first intermediate segment 214 relative to the top segment 212 is as in FIG. 2 attached to with a first end to the upper flange of the first intermediate segment 214. The second end of the at least one string or wire is attached to the bottom side of the powder table 217. The attachment of the string at both the first and second ends may be a releasably attachment. For instance, a slot may be provided for the string in the flange and powder table. The slot is about the same width as the string or wire. The string may at its end be provided with an enlarged portion large enough for not passing through the slot. The slot may have an opening or entrance for the string and the enlarged portion of the string, which opening or entrance is arranged at a position spaced apart from an operating position where the string or wire is restricting the elongation of the telescopic build chamber 210.

Figure 4:
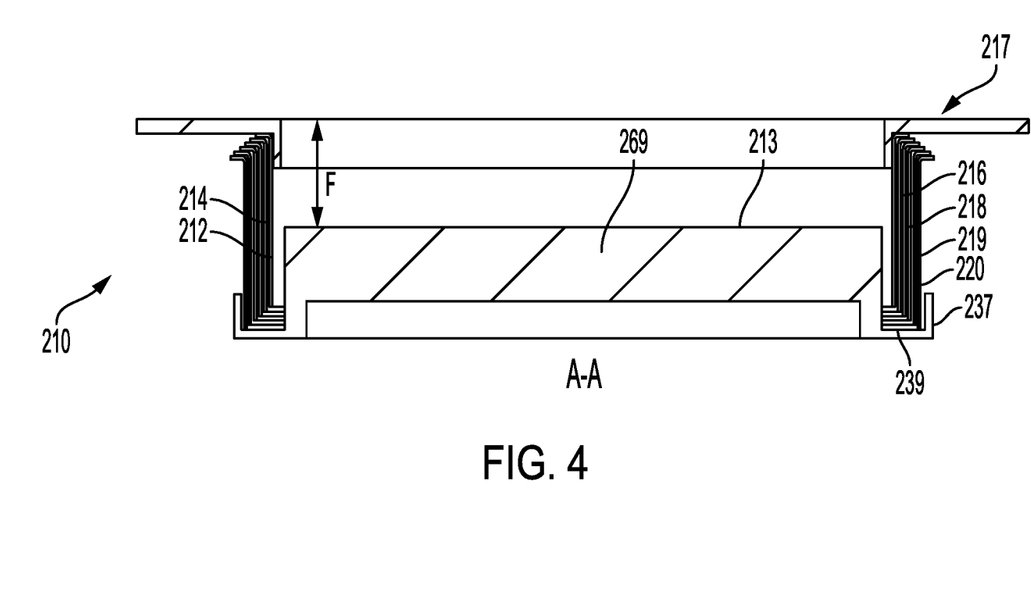
FIG. 4 is a schematic cut view of a telescopic build tank according to the present invention in a compressed state.

FIG. 4 depicts the telescopic build tank 210 in a compressed state. In FIG. 4 the top surface 213 of the build table 269 is provided at a predetermined distance F from a top surface of the powder table when in a fully compressed state. The predetermined distance F may be set at any desirable distance between 0-100 mm. The at least one string or wires are left out for clarity reasons only. As can be seen, all bottom portions of the segments will fit inside the recess 239 between the build table 269 and the wall section 237.

When the three-dimensional article has been finished, the cooling time inside the additive manufacturing apparatus may be decreased if the build table 269 is detached from the build tank 210. When detaching the build table 269 from the build tank 210, non-sintered powder may fell out of the build tank while the three-dimensional article may be exposed to cooler ambient atmosphere compared to the hot powder material.

The build table 19, 269 is displaceable in an axial direction A as depicted in FIG. 1. The top surface 73, 213 is faced upwards for receiving powder material for manufacturing the three-dimensional article. The shape of the build table 19, 269 may be suitably adapted to the smallest segment, i.e., the top segment, of the build tank 210. In the present invention the bottom segment is sealing powder from falling out of the build tank 210 by means of flange 239 and/or wall section 237. Powder is prohibited from falling out between the segments due to a predetermined overlap between adjacent segments. In the present invention the powder table 269 is not sealing against the inner wall of the build tank, i.e., the inner walls of the different segments. This means that the build table is not in mechanical contact with the inner walls of the segments.

In an example embodiment the flanges 292, 294, 296, 298, 299 and 291 and the corresponding segments 212, 214, 216, 218, 219, 220 are made in one piece. Alternatively the flange may be releasable attached to the segments. The flange and the segment may be made of the same material or different materials.

In another aspect of the invention it is provided a program element configured and arranged when executed on a computer to implement a method for forming a three-dimensional article utilizing the build chamber as detailed elsewhere herein. The program may be installed in a computer readable storage medium. The computer readable storage medium may be a distinct control unit. The computer readable storage medium and the program element, which may comprise computer-readable program code portions embodied therein, may further be contained within a non-transitory computer program product. Further details regarding these features and configurations are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 5:
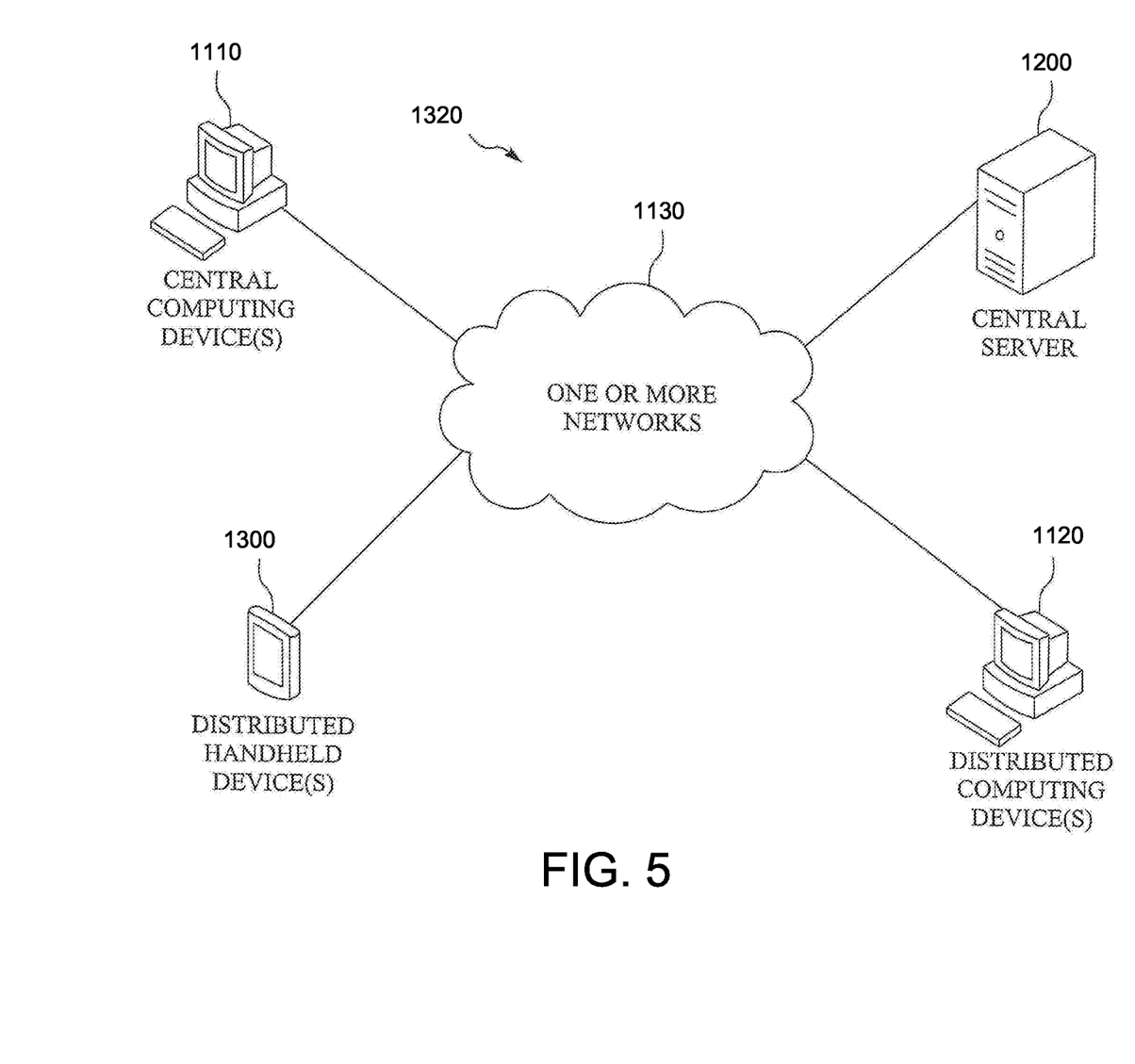
FIG. 5 is a block diagram of an exemplary system according to various embodiments.

FIG. 5 is a block diagram of an exemplary system 1320 that can be used in conjunction with various embodiments of the present invention. In at least the illustrated embodiment, the system 1320 may include one or more central computing devices 1110, one or more distributed computing devices 1120, and one or more distributed handheld or mobile devices 1300, all configured in communication with a central server 1200 (or control unit) via one or more networks 1130. While FIG. 5 illustrates the various system entities as separate, standalone entities, the various embodiments are not limited to this particular architecture.

According to various embodiments of the present invention, the one or more networks 1130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 1130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 1320 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 1110-3100 are illustrated in FIG. 5 as communicating with one another over the same network 1130, these devices may likewise communicate over multiple, separate networks.

According to one embodiment, in addition to receiving data from the server 1200, the distributed devices 1110, 1120, and/or 1300 may be further configured to collect and transmit data on their own. In various embodiments, the devices 1110, 1120, and/or 1300 may be capable of receiving data via one or more input units or devices, such as a keypad, touchpad, barcode scanner, radio frequency identification (RFID) reader, interface card (e.g., modem, etc.) or receiver. The devices 1110, 1120, and/or 1300 may further be capable of storing data to one or more volatile or non-volatile memory modules, and outputting the data via one or more output units or devices, for example, by displaying data to the user operating the device, or by transmitting data, for example over the one or more networks 1130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 1110, 1120, and/or the handheld or mobile device(s) 1300, as may be desirable for particular applications. As will be described in further detail below, in at least one embodiment, the handheld or mobile device(s) 1300 may contain one or more mobile applications 1330 which may be configured so as to provide a user interface for communication with the server 1200, all as will be likewise described in further detail below.

Figure 6:
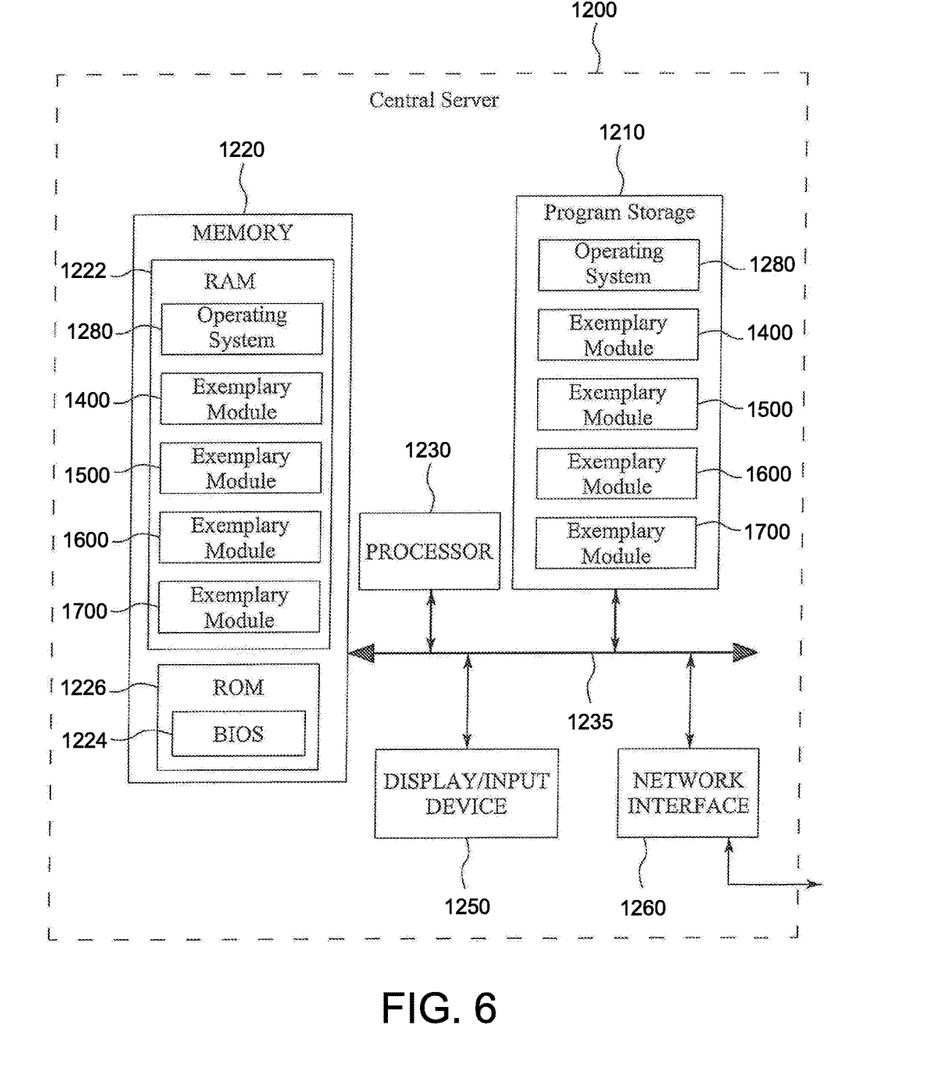
FIG. 6 is a schematic block diagram of an exemplary server according to various embodiments.

FIG. 6 is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which typically includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 1210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 1400-1700) comprising, for example, one or more computer-readable program code portions executable by the processor 1230, may be stored by the various storage devices 1210 and within RAM 1222. Such program modules may also include an operating system 1280. In these and other embodiments, the various modules 1400, 1500, 1600, 1700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 1400, 1500, 1600, 1700 are executed by the server 1200 and are configured to generate one or more graphical user interfaces, reports, instructions, and/or notifications/alerts, all accessible and/or transmittable to various users of the system 1320. In certain embodiments, the user interfaces, reports, instructions, and/or notifications/alerts may be accessible via one or more networks 1130, which may include the Internet or other feasible communications network, as previously discussed.

In various embodiments, it should also be understood that one or more of the modules 1400, 1500, 1600, 1700 may be alternatively and/or additionally (e.g., in duplicate) stored locally on one or more of the devices 1110, 1120, and/or 1300 and may be executed by one or more processors of the same. According to various embodiments, the modules 1400, 1500, 1600, 1700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 1130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 7:
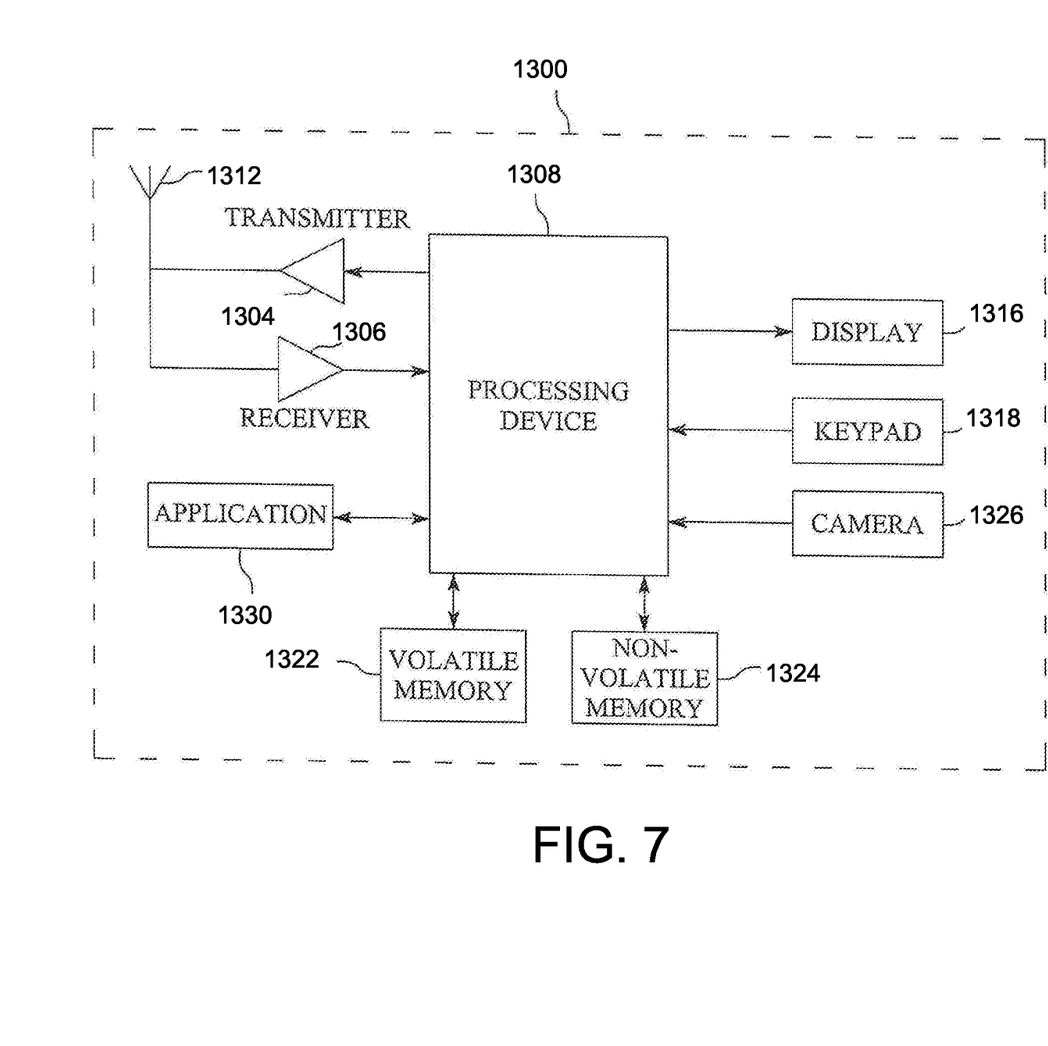
FIG. 7 is a schematic block diagram of an exemplary mobile device according to various embodiments.

FIG. 7 provides an illustrative schematic representative of a mobile device 1300 that can be used in conjunction with various embodiments of the present invention. Mobile devices 1300 can be operated by various parties. As shown in FIG. 7, a mobile device 1300 may include an antenna 1312, a transmitter 1304 (e.g., radio), a receiver 1306 (e.g., radio), and a processing element 1308 that provides signals to and receives signals from the transmitter 1304 and receiver 1306, respectively.

The signals provided to and received from the transmitter 1304 and the receiver 1306, respectively, may include signaling data in accordance with an air interface standard of applicable wireless systems to communicate with various entities, such as the server 1200, the distributed devices 1110, 1120, and/or the like. In this regard, the mobile device 1300 may be capable of operating with one or more air interface standards, communication protocols, modulation types, and access types. More particularly, the mobile device 1300 may operate in accordance with any of a number of wireless communication standards and protocols. In a particular embodiment, the mobile device 1300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 1300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 1300 may include a location determining device and/or functionality. For example, the mobile device 1300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 1300 may also comprise a user interface (that can include a display 1316 coupled to a processing element 1308) and/or a user input interface (coupled to a processing element 1308). The user input interface can comprise any of a number of devices allowing the mobile device 300 to receive data, such as a keypad 1318 (hard or soft), a touch display, voice or motion interfaces, or other input device. In embodiments including a keypad 1318, the keypad can include (or cause display of) the conventional numeric (0-9) and related keys (#, \*), and other keys used for operating the mobile device 1300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 1300 can also include volatile storage or memory 1322 and/or non-volatile storage or memory 1324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 1300.

The mobile device 1300 may also include one or more of a camera 1326 and a mobile application 1330. The camera 1326 may be configured according to various embodiments as an additional and/or alternative data collection feature, whereby one or more items may be read, stored, and/or transmitted by the mobile device 1300 via the camera. The mobile application 1330 may further provide a feature via which various tasks may be performed with the mobile device 1300. Various configurations may be provided, as may be desirable for one or more users of the mobile device 1300 and the system 1320 as a whole.

The invention is not limited to the above-described embodiments and many modifications are possible within the scope of the following claims. Indeed, a person of ordinary skill in the art would be able to use the information contained in the preceding text to modify various embodiments of the invention in ways that are not literally described, but are nevertheless encompassed by the attached claims, for they accomplish substantially the same functions to reach substantially the same results. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A build chamber for an additive manufacturing apparatus for forming a three-dimensional article layer by layer from a powder, the build chamber comprising a build chamber base body and a build table, wherein said build chamber base body comprises at least two segments telescopically coupled together, the at least two segments comprising a top segment and a bottom segment, the top segment being sized to fit inside the bottom segment, wherein:
the top segment is releasably attached to a powder table surrounding said build chamber base body with a bayonet joint or an eccentric latch; and
the bottom segment is releasably attached to said build table with a bayonet joint or an eccentric latch.

2. The build chamber according to claim 1, wherein said at least two segments comprises a plurality of segments, and at least one stroke limitation wire is attached between each adjacent segment in the plurality of segments, creating at least a minimum overlap between said each adjacent segment.

3. The build chamber according to claim 2, wherein said at least one stroke limitation wire is attached on the outside of said segments.

4. The build chamber according to claim 1, wherein a segment x of the at least two segments has a lower flange which extends radially outwards and an adjacent segment x+1 of the at least two segments has an upper flange which extends radially inwards, where said lower flange and said upper flange in said adjacent segments x and x+1 respectively limit the stroke of said telescopic build tank in a downward direction where segment x+1 is larger segment compared to segment x.

5. The build chamber according to claim 1, wherein the build chamber base body is circular.

6. The build chamber according to claim 1, wherein the build chamber base body comprises a shape of a polygon.

7. The build chamber according to claim 1, wherein said build table has a smaller outer dimension than an inner dimension of said top segment.

8. The build chamber according to claim 2, wherein said minimum overlap is at least 1 mm in fully extracted position.

9. The build chamber according to claim 4, wherein there is a gap between an outer dimension of segment x and an inner dimension of segment x+1.

10. The build chamber according to claim 4, wherein there is a gap between an outer dimension of said lower flange of segment x and with an inner dimension of segment x+1.

11. The build chamber according to claim 4, wherein there is a gap between an inner dimension of said upper flange of segment x+1 and with an outer dimension of segment x.

12. A method of using a telescopic build tank for an additive manufacturing apparatus for forming a three-dimensional article layer by layer from a powder, the method comprising the steps of:
positioning a top surface of a build table of the build tank at a first location spaced apart from a powder table; and
during forming of the three-dimensional article, moving the top surface from the first location to at least a second location, the second location being axially displaced from the first location, relative to the telescopic build tank, and intermediate the first location and a location of the powder table,
wherein the moving step causes collapse of a build chamber base body of the telescopic build tank, the build chamber base body comprising at least two segments telescopically coupled together, the at least two segments comprising a top segment and a bottom segment, the top segment being sized to fit inside the bottom segment, wherein:
the top segment is releasably attached to the powder table surrounding said build chamber base body with a bayonet joint or an eccentric latch; and
the bottom segment is releasably attached to said build table with a bayonet joint or an eccentric latch.

13. The method of claim 12, wherein said at least two segments comprises a plurality of segments, and at least one stroke limitation wire is attached between each adjacent segment in the plurality of segments, creating at least a minimum overlap between said each adjacent segment.

14. The method of claim 12, wherein said minimum overlap is at least 1 mm in fully extracted position.

15. A computer program product comprising at least one non-transitory computer-readable storage medium having computer-readable program code portions embodied therein, the computer-readable program code portions comprising one or more executable portions configured for:
positioning a top surface of a build table of a build tank at a first location spaced apart from a powder table; and
during forming of a three-dimensional article, moving the top surface from the first location to at least a second location, the second location being axially displaced from the first location, relative to the build tank, and intermediate the first location and a location of the powder table,
wherein the moving step causes collapse of a build chamber base body of the build tank, the build chamber base body comprising at least two segments telescopically coupled together, the at least two segments comprising a top segment and a bottom segment, the top segment being sized to fit inside the bottom segment, wherein:

the top segment is releasably attached to the powder table surrounding said build chamber base body with a bayonet joint or an eccentric latch; and the bottom segment is releasably attached to said build table with a bayonet joint or an eccentric latch.

* * * * *